(12) United States Patent
Gallagher

(10) Patent No.: US 6,707,998 B2
(45) Date of Patent: Mar. 16, 2004

(54) METHOD AND SYSTEM FOR CORRECTING NON-SYMMETRIC DISTORTION IN AN IMAGE

(75) Inventor: Andrew C. Gallagher, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/145,860

(22) Filed: May 14, 2002

(65) Prior Publication Data

US 2003/0215230 A1 Nov. 20, 2003

(51) Int. Cl.[7] .............................................. G03B 17/24
(52) U.S. Cl. ......................... 396/311; 355/41; 358/506
(58) Field of Search .............................. 355/32, 40, 41, 355/42, 311, 319; 396/311, 319; 358/487, 506, 523, 527

(56) References Cited

U.S. PATENT DOCUMENTS

| | | | |
|---|---|---|---|
| 1,082,678 A | 12/1913 | Casler | |
| 2,479,553 A | 8/1949 | Boecking | 88/24 |
| 2,544,864 A | 3/1951 | Tham et al. | 95/11 |
| 3,006,248 A | 10/1961 | Linke et al. | 88/57 |
| 4,932,764 A | 6/1990 | Simpson | 350/441 |
| 5,000,552 A | 3/1991 | Simpson, Jr. et al. | 350/480 |
| 5,461,440 A | 10/1995 | Toyoda et al. | 354/106 |
| 5,671,297 A | 9/1997 | Koppe et al. | 382/293 |
| 5,675,380 A | 10/1997 | Florent et al. | 348/251 |
| 5,917,578 A * | 6/1999 | Nakamura | 355/40 |
| 6,313,902 B1 * | 11/2001 | Enomoto | 355/18 |
| 6,349,171 B1 | 2/2002 | Koike | 396/6 |

* cited by examiner

Primary Examiner—David M. Gray
(74) Attorney, Agent, or Firm—David M. Woods

(57) ABSTRACT

Non-symmetric distortion generated by an imaging system producing a distortion predominantly in one image dimension is corrected by providing a distortion model capable of correcting the non-symmetric distortion in an image that is predominantly in the one image dimension, providing one or more correction parameters, wherein at least one correction parameter relates to the distortion predominantly in the one image dimension, and generating an image corrected for the non-symmetric distortion by using the distortion model and the one or more correction parameters.

30 Claims, 3 Drawing Sheets

METHOD AND SYSTEM FOR CORRECTING NON-SYMMETRIC DISTORTION IN AN IMAGE

FIELD OF THE INVENTION

The invention relates generally to the field of digital image processing and, more particularly, to a method for correcting distortion in an image.

BACKGROUND OF THE INVENTION

Typically, cameras have a flat image surface. That is, the film or image sensor is typically flat. Aberrations in the optical system can produce field curvature. Field curvature describes the condition where the focal surface of the optical system is actually a curved surface rather than planar.

A camera having a curved image surface was described by H. Casler in U.S. Pat. No. 1,082,678. Casler disclosed a camera using flexible film and mechanically forcing the film negative to conform more closely to the focal surface than is typically accomplished with a flat film image surface, thereby producing improved image quality.

The curved image surface is advantageous because it compensates for the optical aberrations of field curvature and distortion. Distortion refers to the variation of the image magnification with the position in the image. U.S. Pat. Nos. 2,479,553; 2,544,864; 3,006,248; 4,932,764 and 5,000,552 all describe cameras having optical systems with curved image surfaces. In general the curved image surface is cylindrical, which is an approximation to the ideal spherical image surface. The manufacture of a spherical image surface is not practical because film is manufactured in flat sheets and with bending can conform to a cylindrical shape, but is incapable of conforming to a spherical shape without tearing or wrinkling the film. Alternatively, it is extremely difficult to manufacture film that is not flat.

Single-use cameras (sometimes called lens-fitted film) have been popular for the reason that they provide an inexpensive means for individuals to practice photography. These cameras often employ a curved (cylindrical) image surface with a fixed position lens to partially correct for several optical aberrations, including field curvature and distortion. Having the cylindrical image surface for the film negative partially compensates for the field curvature and distortion of the optical system. However, because a cylindrical (rather than spherical) focal surface is used, the effects of distortion are different in each image dimension. In the dimension parallel to the axis of the cylindrical focal surface, the distortion is worse than in the other dimension. Thus, the distortion is not radially symmetric. The remaining distortion is still of large enough magnitude to adversely affect the quality of the image. Koike, in U.S. Pat. No. 6,349,171, describes a specific design for the lens of such a camera to reduce the effects of optical aberrations other than distortion. The distortion of a digital image scanned from an image captured from such a system then is digitally processed to remove distortion. While Koike describes a method of reducing the processing time to produce a pleasing digital image, an efficient means for performing the distortion correction is not described.

As described by Koike, distortion in an image may be corrected digitally. However, it is generally assumed that the distortion in an optical system is radially symmetric, and the distortion magnitude can be represented by a single parameter. (See, for example, Toyoda et al. in U.S. Pat. No. 5,461,440.) It is difficult to simultaneously correct for the distortion in both dimensions of an image captured with a cylindrically curved image surface with a symmetric model of image distortion.

Alternatively, both Toyoda et al. and Florent et al. (in U.S. Pat. No. 5,675,380) also describe that the distortion of any optical system can be determined and corrected by imaging a target and finding the difference between the image of the target and an ideal image of the target (derived from a model of perspective projection). An image of correction vectors can be generated by comparing the image of the target and an ideal image of the target. The correction vectors are used to geometrically transform (warp) any image from the optical system to be free of distortion. While this method can indeed correct image distortion, even non-symmetric distortion, it has several drawbacks. First, the correction vectors represent a significant amount of data, and storage of the correction vectors requires significant system resources. Secondly, this method does not allow for the correction of distortion of an image if the optical system from which the image was produced has not first imaged the target. Furthermore, the huge number of correction vectors is too many for an operator to manually optimize.

Therefore a need exists for a method of correcting a non-symmetric distortion in images which has low memory requirements and does not require target images to first be imaged with the optical system.

SUMMARY OF THE INVENTION

The present invention is directed to overcoming one or more of the problems set forth above. Briefly summarized, according to one aspect of the invention, a method for correcting for non-symmetric distortion in an image generated from an imaging system producing a distortion predominantly in one image dimension includes the steps of: providing a distortion model capable of correcting the non-symmetric distortion in the image that is predominantly in the one image dimension; providing one or more correction parameters, wherein at least one correction parameter relates to the distortion predominantly in the one image dimension; and generating an image corrected for the non-symmetric distortion by using the distortion model and the one or more correction parameters.

In a further aspect of the invention, a system for correcting non-symmetric distortion in an image generated from an imaging system producing a distortion predominantly in one image dimension comprises: a distortion corrector utilizing a distortion model capable of correcting the non-symmetric distortion in the image that is predominantly in the one image dimension; a source of one or more correction parameters, wherein at least one correction parameter relates to the distortion predominantly in the one image dimension; and means for inputting the correction parameters into the distortion corrector, thereby generating an image corrected for distortion by using the distortion model and the correction parameters.

One of the advantages of the invention is that it provides a simple and efficient way to improve images produced by inexpensive cameras, such as single use cameras, that employ a cylindrical imaging surface to partially compensate for distortion caused by inexpensive fixed focal length lenses. Such cameras produce images that compensate to some extent for distortion, such as barrel distortion, in one image dimension but leave a non-symmetric distortion, such as pincushion distortion, in the other dimension. The present invention provides an advantageous way to correct for the remaining non-symmetric distortion. Moreover, correction can be provided in both dimensions, as necessary or desired in specific cases to further improve the image.

These and other aspects, objects, features and advantages of the present invention will be more clearly understood and appreciated from a review of the following description of the preferred embodiments and appended claims, and by reference to the accompanying drawings.

DETAILED DESCRIPTION OF THE INVENTION

In the following description, an embodiment of the present invention will be described as a method that would ordinarily be implemented as a software program. Those skilled in the art will readily recognize that the equivalent of such software may also be constructed in hardware. Because image enhancement algorithms and methods are well known, the present description will be directed in particular to elements forming part of, or cooperating more directly with, the method and system in accordance with the present invention. Other elements, and hardware and/or software for producing and otherwise processing the image signals, not specifically shown or described herein, may be selected from such materials, components and elements known in the art. Given the system and method as shown and described according to the invention in the following materials, software not specifically shown, described or suggested herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
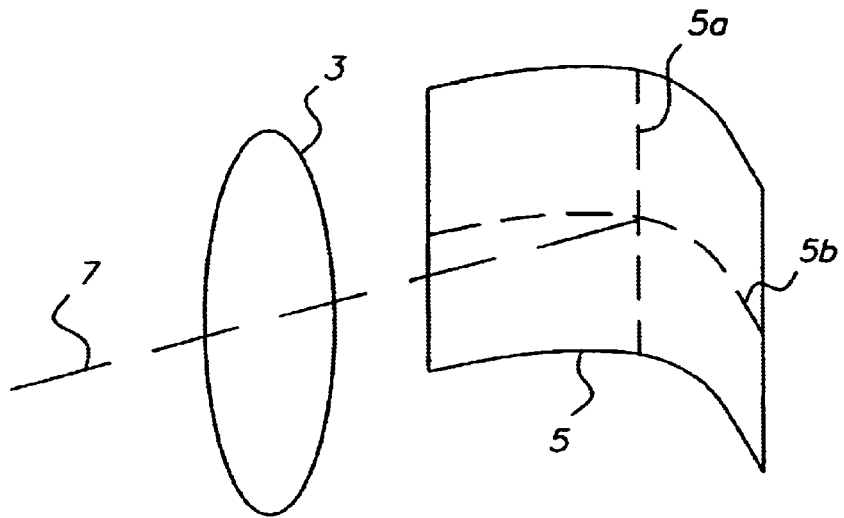
FIG. 1 is a diagram illustrating an imaging system from the prior art utilizing a cylindrical imaging surface.

FIG. 1 illustrates an imaging system from the prior art wherein the image surface 5 is a cylindrical surface. A lens 3 on the optical axis 7 exhibits field curvature and distortion, resulting in improved image quality when the imaging surface is a cylindrical surface as opposed to a planar surface. In this context, a cylindrical surface is a surface where at each point on the surface, there is at least one direction 5a where the surface is linear. In other words, the Gaussian curvature of the cylindrical surface is 0. While the image surface 5 would typically comprise, or support, a flat photographic film (e.g., a negative or positive film), the image surface 5 may comprise without limitation any image sensitive surface, e.g., a electronic sensor comprised of photosensitive image pixels, that can be made to take a cylindrical surface form. In the case of a film, the cylindrical surface allows a flat film to be bent to conform to the focal surface without tearing or creasing the film.

As can be seen in FIG. 1, the image surface is linear along the short dimension 5a of the imaging surface 5 (which will hereinafter be referred to as the film negative 5). However, this is not necessary for successful implementation of the present invention. In fact, the present invention can be used to successfully remove non-symmetric distortion from an image regardless of the cause of the distortion, in particular where the distortion is predominantly in one image dimension. As also shown in FIG. 1, the long dimension 5b of the film negative is curved.

Figure 2:
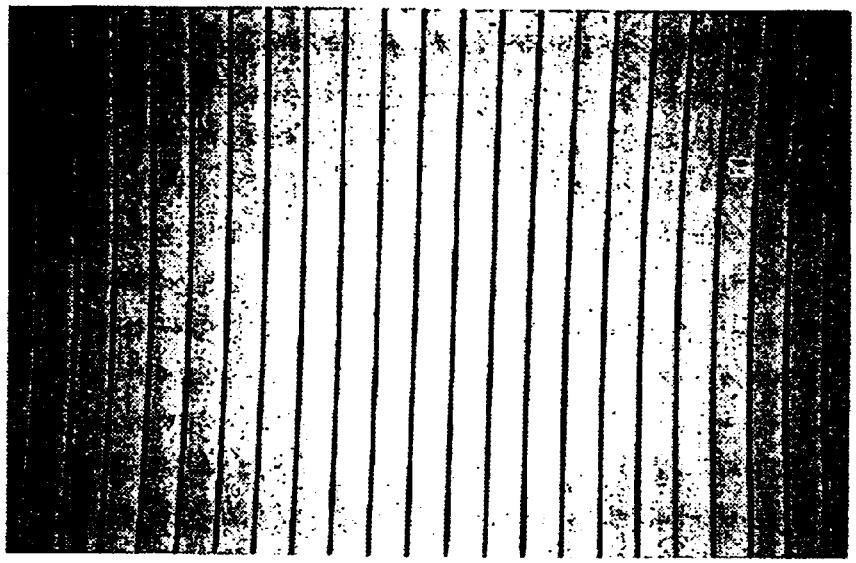
FIG. 2 is an example image produced by the cylindrical imaging surface shown in FIG. 1, showing non-symmetrical distortion in lines parallel to the short dimension of the surface.

FIG. 2 shows an example image of lines parallel to the short dimension 5a of the film negative 5. These lines exhibit significant curvature due to distortion (pincushion) because the film negative 5 is linear in the short dimension 5a but the focal surface is actually spherical and curves in both image dimensions 5a and 5b. This type of distortion is typical of cameras such as single-use-cameras which employ a cylindrical film surface, where the distortion is predominantly in the short dimension of the image. Alternatively, because of the curved image surface, an image of lines parallel to the long dimension 5b of the film negative 5 show very little distortion because the curvature of the film surface is closely matched to the cylindrical shape of the image surface.

Concerning matters of nomenclature, a digital image is comprised of a number of digital image channels. Often, an image has three digital image channels, that is, red, green, and blue image channels. An image i(x,y) contains X+1 rows and Y+1 columns of pixels. For convenience, the origin of the coordinate system is assumed to be at the center of the image. That is, location (0,0) is the center of the image. The pixel located in the upper left corner of the image has location (−X/2, Y/2), while the pixel in the lower right corner of the image has location (−X/2, −Y/2). It is also convienient to use normalized coordinates, in particular to accommodate different sized imaging surfaces. The normalized coordinate is obtained by scaling each coordinate by half the diagonal length (in pixels) of the image. Normalized locations are indicated with a bar over the coordinate. For example, $$(\bar{x}, \bar{y}) = \left( \frac{2x}{\sqrt{X^2+Y^2}}, \frac{2y}{\sqrt{X^2+Y^2}} \right),$$

where the normalizing quantity is $$d = \frac{\sqrt{X^2+Y^2}}{2}.$$

Figure 3:
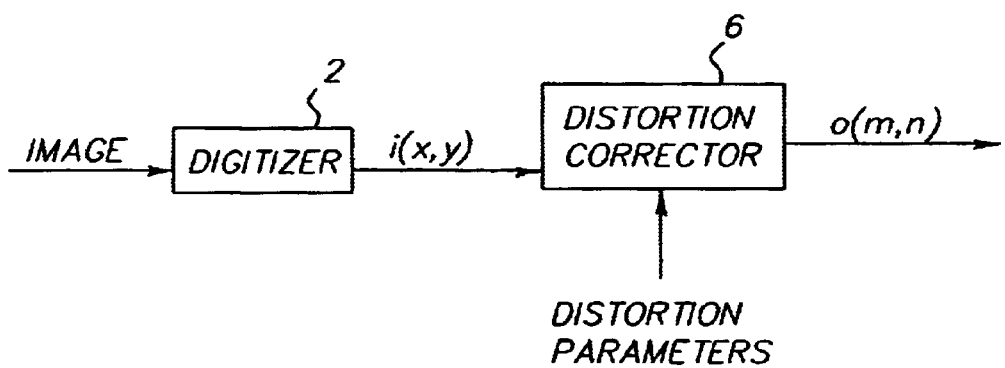
FIG. 3 shows a block diagram of a distortion corrector according to the invention.

The operation of the present invention is shown in FIG. 3. An image, e.g., a film image captured by the system shown in FIG. 1, is digitized by a digitizer 2 such as a scanner or an image sensor, e.g., a charge-coupled device (CCD), and the digital image i(x,y) is passed to a distortion corrector 6. A corrected digital image o(m,n) is output from the distortion corrector 6. In order to generate the corrected image, one or more distortion parameters are passed to the distortion corrector 6. The distortion parameters are used with a distortion model to correct the distortion from the image. The distortion model, together with various values of the distortion parameters, can correct for many different levels of nonsymmetrical distortion. Accordingly, the digital image o(m,n) output from the distortion corrector 6 is corrected for the non-symmetrical distortion.

The output image o(m,n) is generated by the distortion corrector 6 as follows. Preferably, the output image o(m,n) has the same number of rows and columns as the input digital image i(x,y). In other words, M=X and N=Y. Each pixel location in the output image $o(m_o,n_o)$ is mapped to a specific location in the input digital image $i(x_o,y_o)$. Typically, $(x_o,y_o)$ will not correspond to an exact integer location, but will fall between pixels on the input digital image i(x,y). The value of the pixel $o(m_o,n_o)$ is determined by interpolating the value from the pixel values nearby $i(x_o,y_o)$. This type of interpolation is well known in the art of image processing and can be accomplished by nearest neighbor interpolation, bilinear interpolation, bicubic interpolation, or any number of other interpolation methods. For example, U.S. Pat. No. 5,671,297 describes one such interpolation method for use with distortion compensation. If the location $i(x_o,y_o)$ falls outside of the range of the image i(x,y) (i.e., if $x_o<-X/2$ or $x_o>X/2$ or $y_o<-Y/2$ or $y_o>Y/2$), then the value of $o(m_o,n_o)$ is set to a default value such as 0 or 255, or the value of $o(m_o,n_o)$ is set to the value of the nearest pixel of i(x,y).

The distortion model governs the mapping of locations (m,n) of the output image to locations (x,y) of the input image. In the preferred embodiment the distortion model, which maps a specific location $(m_o,n_o)$ of the output image to a location $(x_o,y_o)$ in the input image, is given as:

$$x_o = \left(\overline{m_o} + \frac{ca_x\overline{m_o}}{z \cdot z_x}\left[\left(\frac{\overline{m_o}}{z \cdot z_x}\right)^2 + \left(\frac{\overline{n_o}}{z \cdot z_y}\right)^2\right]\right)d$$

$$y_o = \left(\overline{n_o} + \frac{ca_y\overline{n_o}}{z \cdot z_y}\left[\left(\frac{\overline{m_o}}{z \cdot z_x}\right)^2 + \left(\frac{\overline{n_o}}{z \cdot z_y}\right)^2\right]\right)d$$

where:
- c=the channel specific zoom factor used to correct for chromatic aberration. For example, c=0.997, 1.0, 1.004 for the red, green, and blue digital image channels, respectively. Default is 1.0.
- $a_x$=the distortion parameter for the long dimension of the image. Preferably, $a_x=-0.015$ which compensates for the small amount of barrel distortion in that dimension, despite the cylindrical image surface.
- $a_y$=the distortion parameter for the short dimension of the image. Preferably, $a_y=0.09$ which compensates for the large amount of pincushion distortion in that dimension.
- z=an overall zoom factor designed to ensure that location $(x_o,y_o)$ falls within the limits of the image. Default is 1.0.
- $z_x$=a zoom factor for the long dimension of the image. Default is 1.0. This zoom factor can be used to correct an incorrect image aspect ratio.
- $z_y$=a zoom factor for the short dimension of the image. Default is 1.0. This zoom factor can be used to correct an incorrect image aspect ratio.
- d=the normalization quantity.

$$d = \frac{\sqrt{X^2 + Y^2}}{2}$$

The parameters c, $a_x$, $a_y$, z, $z_x$, and $z_y$ are the aforementioned distortion parameters. The distortion model represents a non-symmetric distortion model any time that $a_x \neq a_y$, that is, in particular where the distortion is predominantly in one image dimension, which in this case is the short dimension of the image. Notice that the described distortion model is a $3^{rd}$ order polynomial that does an excellent job of non-symmetric distortion correction, but higher order terms could also be included.

If $a_x=a_y$, then the distortion corrector 6 performs a radially symmetric distortion correction. Assuming default values for c, z, $z_x$, and $z_y$, the distortion model requires only two parameter values ($a_x$ and $a_y$) to correct for the nonsymmetrical distortion found in cameras with cylindrical image surfaces. If the cylindrical image surface accurately follows the focal surface of the image system, then the distortion along the long dimension of the image may be negligible and $a_x=0$, requiring specification only of $a_y$.

Figure 4:
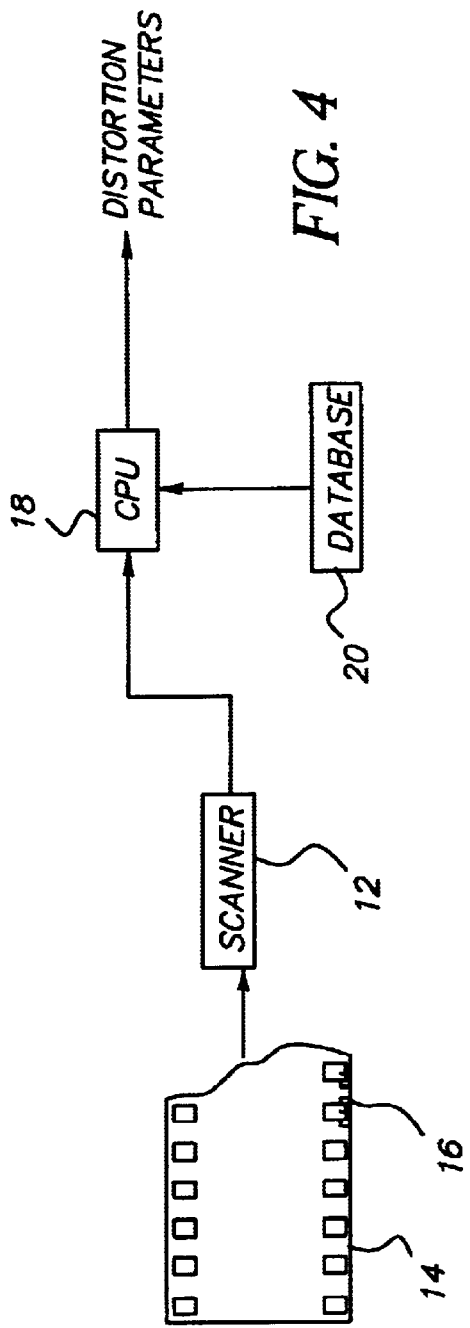
FIG. 4 shows a technique for selecting distortion parameters that are supplied to the distortion corrector shown in FIG. 3.

The distortion parameters are preferably supplied to the distortion corrector 6 according to a parameter selection technique such as shown in FIG. 4. The technique is based on having indicia on, or associated with, the image that reference the appropriate parameters. For instance, as shown in FIG. 4, a scanner 12 reads a bar code 16 from a photographic film 14. The bar code 16 is preferably written to the film in an area of the film not used for imaging at the time of manufacture, as is commonly practiced. A unique bar code 16 is assigned to photographic films that are placed in a specific camera having an optical system with non-symmetric distortion. The bar code 16 represents identification data that relates specific distortion parameters to known optical systems that would be used with the particular film 14. The scanner 12 reads the bar code 16, and a processor (CPU) 18 receives the identification data derived from the bar code 16. The CPU 18 retrieves pre-established values for the distortion parameters from a look-up-table (LUT), or from other means such as an equation. For example, the distortion parameters for specific films, as referenced by the bar code 16, may be stored in a LUT in a database 20 and passed to the distortion corrector 6. It should also be clear that other types of indicia, such as a magnetic recording on a magnetic layer on the film, may be used without limitation in place of the bar code.

Note that the distortion parameters may comprise two parts: a baseline correction that could apply to any imaging system, i.e., to a known set of optical systems that would be used with a known set of films, and a plurality of delta correction factors that could be added to the baseline correction, depending on the particular imaging system in use. Since the baseline correction factor could be a permanent part of the algorithm implemented by the distortion corrector 6, while the database 20 would only need to store the delta factors, this could be advantageous in minimizing the storage requirements of the system. In fact, if the delta factor can be limited to a few bits, it could be directly stored as the bar code 16.

Alternatively, an operator may determine the optimal values of the distortion parameters interactively by, e.g., using a graphical user interface (GUI). The operator may use many different values of the distortion parameters and, with visual feedback, select the optimal distortion parameters. This method of selecting the distortion parameters can be used with images from unknown optical systems with unknown levels of distortion.

Figure 5:
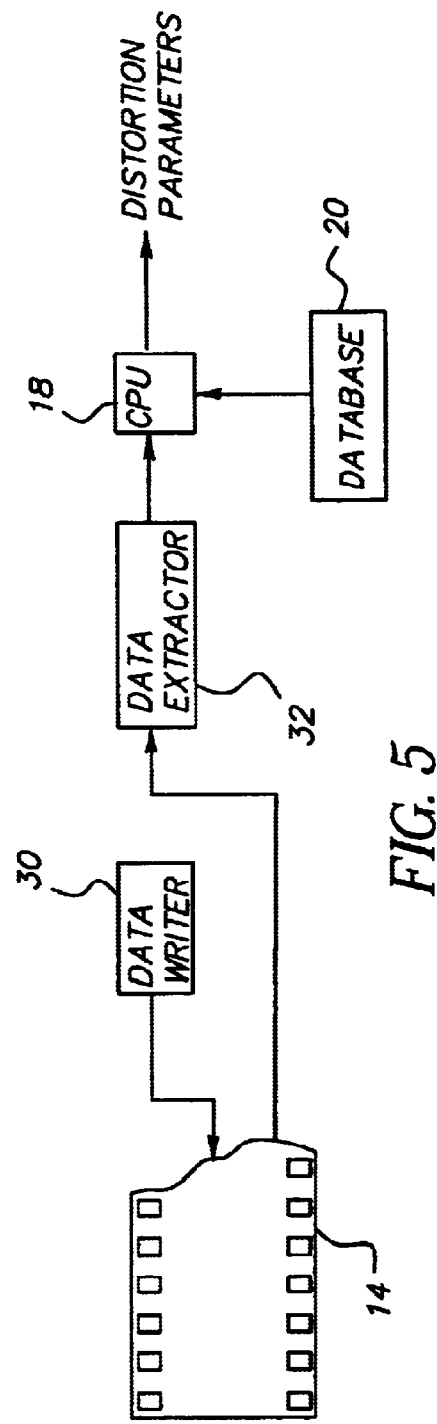
FIG. 5 shows an alternative technique for selecting distortion parameters that are supplied to the distortion corrector shown in FIG. 3.

Alternatively as shown in FIG. 5, identification data may be written on the film 14 with a data writer 30 in order to indicate the distortion parameters or camera characteristics such as focal length. Preferably, the data writer 30 is located in a camera, but alternatively the data writer 30 may be used to write identification data to the film 14 prior to the film being loaded in the camera. The identification data may be written by the data writer 30 by exposing the film 14 to light, or by writing the identification data to a magnetic strip, or by writing a bar code to the film 14, or by any other means. The identification data may indicate that the camera has a cylindrical film surface, or it may indicate explicitly the distortion parameters or it may indicate a code, which can be used by a CPU with a LUT, equation, and/or database 20 to determine the distortion parameters. Later, a data extractor 32 is used to read the identification data from the film 14. Finally, given distortion parameters accessible from a look-up-table (LUT) or other means such as a database or an equation, the CPU 18 uses the identification data with the LUT, equation, and/or database 20 to determine the distortion parameters to pass to the distortion corrector 6.

Figure 6:
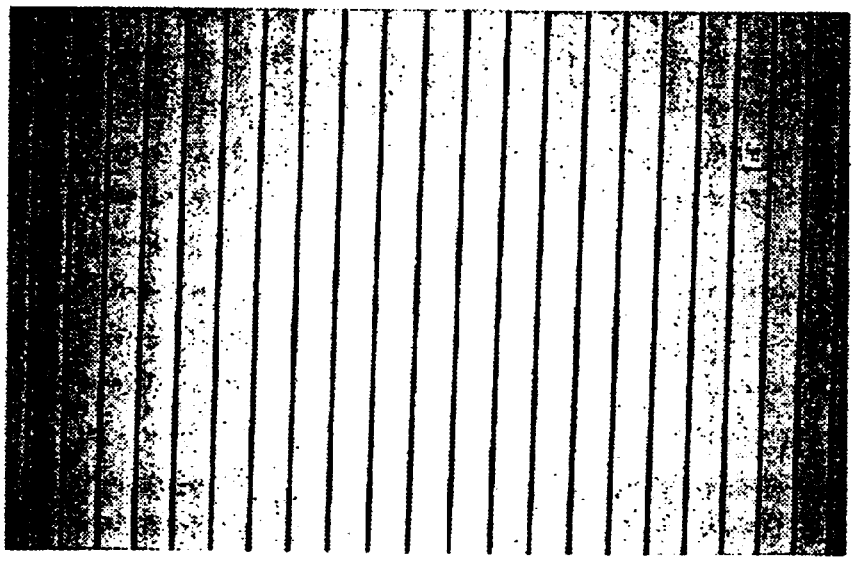
FIG. 6 is an example of the image shown in FIG. 2 corrected for non-symmetric distortion according to the invention.

FIG. 6 demonstrates the utility of the present invention by showing an image, corrected for non-symmetric distortion. The lines, which were curved by distortion in FIG. 2, have been straightened by the non-symmetric distortion correction.

As yet another alternative, the digital image i(x,y) may internally store the distortion parameters, or an identification code relating to the distortion parameters. Non-image data related with a digital image is commonly referred to as metadata. Thus, the distortion parameters may be stored as metadata associated with the digital image i(x,y).

Parts List 2 digitizer
3 lens
5 cylindrical image surface
5a short dimension
5b long dimension
6 distortion corrector
7 optical axis
12 scanner
14 film
16 bar code
18 processor (CPU)
20 database
30 data writer
32 data extractor

What is claimed is:

1. A method of correcting for non-symmetric distortion in an image having specific pixel locations generated from an imaging system producing a distortion predominantly in one image dimension, said method comprising the steps of:
   a) providing a distortion model capable of correcting the non-symmetric distortion in the image that is predominantly in the one image dimension, wherein the distortion model describes the mapping of a specific pixel location $(m_o, n_o)$ of an image corrected for the non-symmetric distortion to a corresnonding location $(x_o, y_o)$ in the image;
   b) providing one or more correction parameters, wherein each correction parameter relates to the distortion predominantly in the one image dimension; and
   c) generating a pixel value of the image corrected for the non-symmetric distortion at the specific pixel location $(m_o, n_o)$ by using the distortion model and the one or more correction parameters to determine the corresponding location $(x_o, y_o)$ in the image, and using interpolation of nearby pixel values of the image to determine the pixel value.

2. The method as claimed in claim 1 wherein the one or more correction parameters relate to a pincushion distortion in the image.

3. The method as claimed in claim 1 wherein the one or more correction parameters relate to a zoom factor to correct an incorrect image aspect ratio in the image.

4. The method as claimed in claim 1 wherein the step b) of providing one or more correction parameters comprises the steps of:
   storing identification data in a database relating to the correction parameters for a plurality of imaging systems;
   determining identification data for a particular imaging system that is in use; and
   using the determined identification data and the database to obtain the correction parameters.

5. The method of claim 1 wherein the distortion model includes a normalized coordinate location and an offset to the normalized coordinate location found by multiplying the correction parameter by a quantity related to the normalized coordinate location.

6. The method of claim 1 wherein the distortion model maps a specific normalized location of the output image to a location $(x_o, y_o)$ in the image, and is given as:

$$x_o = \left( \overline{m_o} + \frac{ca_x \overline{m_o}}{z \cdot z_x} \left[ \left( \frac{\overline{m_o}}{z \cdot z_x} \right)^2 + \left( \frac{\overline{n_o}}{z \cdot z_y} \right)^2 \right] \right) d$$

$$y_o = \left( \overline{n_o} + \frac{ca_y \overline{n_o}}{z \cdot z_y} \left[ \left( \frac{\overline{m_o}}{z \cdot z_x} \right)^2 + \left( \frac{\overline{n_o}}{z \cdot z_y} \right)^2 \right] \right) d$$

where:
   c=a channel specific zoom factor used to correct for chromatic aberration,
   $a_x$=a distortion parameter for the long dimension of the image,
   $a_y$=a distortion parameter for the short dimension of the image,
   z=an overall zoom factor designed to ensure that location $(x_o, y_o)$ falls within the limits of the image,
   $z_x$=a zoom factor for the long dimension of the image,
   $z_y$=a zoom factor for the short dimension of the image, and
   d=the normalization quantity $$d = \frac{\sqrt{X^2 + Y^2}}{2}.$$

7. A method of capturing an image having specific pixel locations and correcting for non-symmetric distortion in the image, said method comprising the steps of:
   a) generating an image from an image capture surface producing a non-symmetric distortion predominantly in a particular image dimension due to curvature of the image capture surface;
   b) providing a distortion model capable of correcting the non-symmetric distortion in the image that is predominantly in the particular image dimension, wherein the distortion model describes the mapping of a specific pixel location $(m_o, n_o)$ of an image corrected for the non-symmetric distortion to a corresponding location $(x_o, y_o)$ in the image,
   c) providing one or more correction parameters, wherein each correction parameter relates to the distortion predominantly in the particular image dimension; and
   d) generating a pixel value of the image corrected for the non-symmetric distortion at the specific pixel location $(m_o, n_o)$ by using the distortion model and the one or more correction parameters to determine the corresponding location $(x_o, y_o)$ in the image, and using interpolation of nearby pixel values of the image to fetermine the pixel value.

8. The method as claimed in claim 7 wherein the one or more correction parameters relate to a pincushion distortion in the image.

9. The method as claimed in claim 7 wherein the one or more correction parameters relate to a zoom factor to correct an incorrect image aspect ratio in the image.

10. The method as claimed in claim 7 wherein the step c) of providing one or more correction parameters comprises the steps of:
   storing identification data in a database relating to the correction parameters for a plurality of imaging systems;
   determining identification data for a particular imaging system that is in use; and
   using the determined identification data and the database to obtain the correction parameters.

11. The method as claimed in claim 7 wherein the curvature of the image capture suface is a cylindrical curvature.

12. The method as claimed in claim 11 wherein the image capture surface supports a photographic film formed into a cylindrical shape.

13. The method of claim 7 wherein the distortion model includes a normalized coordinate location and an offset to the normalized coordinate location found by multiplying the correction parameter by a quantity related to the normalized coordinate location.

14. The method of claim 7 wherein the distortion model maps a specific normalized location of the output image to a location $(x_o, y_o)$ in the image, and is given as:

$$x_o = \left(\overline{m_o} + \frac{ca_x \overline{m_o}}{z \cdot z_x}\left[\left(\frac{\overline{m_o}}{z \cdot z_x}\right)^2 + \left(\frac{\overline{n_o}}{z \cdot z_y}\right)^2\right]\right)d$$

$$y_o = \left(\overline{n_o} + \frac{ca_y \overline{n_o}}{z \cdot z_y}\left[\left(\frac{\overline{m_o}}{z \cdot z_x}\right)^2 + \left(\frac{\overline{n_o}}{z \cdot z_y}\right)^2\right]\right)d$$

where:
   c=a channel specific zoom factor used to correct for chromatic aberration,
   $a_x$=a distortion parameter for the long dimension of the image,
   $a_y$=a distortion parameter for the short dimension of the image,
   z=an overall zoom factor designed to ensure that location $(x_o, y_o)$ falls within the limits of the image,
   $z_x$=a zoom factor for the long dimension of the image,
   $z_y$=a zoom factor for the short dimension of the image, and
   d=the nomialization quantity $$d = \frac{\sqrt{X^2 + Y^2}}{2}.$$

15. A system for correcting non-symmetric distortion in an image having specific pixel locations generated from an imaging system producing a distortion predominantly in one image dimension, said system comprising:
   a) a distortion corrector utilizing a distortion model capable of correcting the non-symmetric distortion in the image that is predominantly in the one image dimension, wherein the distortion model describes the mapping of a specific pixel location $(m_o, n_o)$ of an image corrected for the non-symmetric distortion to a corresponding location $(x_o, y_o)$ in the image;
   b) a source of one or more correction parameters, wherein each correction parameter relates to the distortion predominantly in the one image dimension; and
   c) means for inputting the correction parameters into the distortion corrector, thereby generating a pixel value of the image corrected for distortion at the specific pixel location $(m_o, n_o)$ by using the distortion model and the correction parameters to determine the corresonding location $(x_o, y_o)$ in the image, and using interpolation of nearby pixel values of the image to determine the pixel value.

16. The system as claimed in claim 15 wherein the imaging system is a photographic camera utilizing photographic film, and the one or more correction parameters are identified from coding on the film.

17. The system as claimed in claim 16 further including a database of correction factors, and the coding on the film references the one or more correction factors from the database.

18. The system as claimed in claim 15 wherein the correction parameters are stored as meta data with the image.

19. The system as claimed in claim 15 wherein the distortion corrector includes a baseline correction for all imaging systems and the one or more correction parameters are stored as delta values that are added to the baseline correction.

20. The system of claim 15 wherein the distortion model includes a normalized coordinate location and an offset to the normalized coordinate location found by multiplying the correction parameter by a quantity related to the normalized coordinate location.

21. The system of claim 15 wherein the distortion model maps a specific normalized location of the output image to a location $(x_o, y_o)$ in the image, and is given as:

$$x_o = \left(\overline{m_o} + \frac{ca_x \overline{m_o}}{z \cdot z_x}\left[\left(\frac{\overline{m_o}}{z \cdot z_x}\right)^2 + \left(\frac{\overline{n_o}}{z \cdot z_y}\right)^2\right]\right)d$$

$$y_o = \left(\overline{n_o} + \frac{ca_y \overline{n_o}}{z \cdot z_y}\left[\left(\frac{\overline{m_o}}{z \cdot z_x}\right)^2 + \left(\frac{\overline{n_o}}{z \cdot z_y}\right)^2\right]\right)d$$

where:
   c=a channel specific zoom factor used to correct for chromatic aberration,
   $a_x$=a distortion parameter for the long dimension of the image,
   $a_y$=a distortion parameter for the short dimension of the image,
   z=an overall zoom factor designed to ensure that location $(x_o, y_o)$ falls within the limits of the image;
   $z_x$=a zoom factor for the long dimension of the image,
   $z_y$=a zoom factor for the short dimension of the image, and
   d=the normalization quantity $$d = \frac{\sqrt{X^2 + Y^2}}{2}.$$

22. A system of capturing an image having specific pixel locations and correcting for non-symmetric distortion in the image, said system. comprising:
   an image capture device for generating an image from an image capture surface producing a non-symmetric distortion predominantly in a particular image dimension due to curvature of the image capture surface;

a distortion corrector utilizing a distortion model capable of correcting the non-symmetric distortion in the image that is predominantly in the particular image dimension, wherein the distortion model describes the mapping of a specific pixel location ($m_o, n_o$) of an image corrected for the non-symmetric distortion to a corresponding location ($x_o, y_o$) in the image;

a source of one or more correction parameters, wherein each correction parameter relates to the distortion predominantly in the particular image dimension; and means for inputting the correction factors into the distortion corrector, thereby generating a pixel value of the image corrected for the non-symmetric distortion at the specific pixel location ($m_o, n_o$) by using the distortion model and the one or more correction parameters to determine the corresponding location ($x_o, y_o$) in the image, and using interpolation of nearby pixel values of the image to determine the pixel value.

23. The system as claimed in claim 22 wherein the image capture device is a photographic camera utilizing photographic film.

24. The system as claimed in claim 23 wherein the one or more correction parameters are identified from coding on the film.

25. The system as claimed in claim 24 wherein the coding is written on the film by the image capture device.

26. The system as claimed in claim 22 wherein the curvature of the image capture surface is a cylindrical curvature.

27. The system as claimed in claim 26 wherein the image capture surface supports a photographic film formed into a cylindrical shape.

28. The system as claimed in claim 27 wherein the image capture device is a single use camera.

29. The system of claim 22 wherein the distortion model includes a normalized coordinate location and an offset to the normalized coordinate location found by multiplying the correction parameter by a quantity related to the normalized coordinate location.

30. The system of claim 22 wherein the distortion model maps a specific normalized location of the output image to a location ($x_o, y_o$) in the image, and is given as:

$$x_o = \left(\overline{m_o} + \frac{ca_x\overline{m_o}}{z \cdot z_x}\left[\left(\frac{\overline{m_o}}{z \cdot z_x}\right)^2 + \left(\frac{\overline{n_o}}{z \cdot z_y}\right)^2\right]\right)d$$

$$y_o = \left(\overline{n_o} + \frac{ca_y\overline{n_o}}{z \cdot z_y}\left[\left(\frac{\overline{m_o}}{z \cdot z_x}\right)^2 + \left(\frac{\overline{n_o}}{z \cdot z_y}\right)^2\right]\right)d$$

where:

c=a channel specific zoom factor used to correct for chromatic aberration, $a_x$=a distortion parameter for the long dimension of the image, $a_y$=a distortion parameter for the short dimension of the image, z=an overall zoom factor designed to ensure that location ($x_o, y_o$) falls within the limits of the image, $z_x$=a zoom factor for the long dimension of the image, $z_y$=a zoom factor for the short dimension of the image, and d=the normalization quantity $$d = \frac{\sqrt{X^2 + Y^2}}{2}.$$

* * * * *